United States Patent
Ishide et al.

(10) Patent No.: US 6,608,281 B2
(45) Date of Patent: Aug. 19, 2003

(54) LASER BEAM MACHINING HEAD AND LASER BEAM MACHINING APPARATUS HAVING SAME

(75) Inventors: Takashi Ishide, Takasago (JP); Yoshio Hashimoto, Takasago (JP); Masao Watanabe, Kobe (JP); Takashi Akaba, Kobe (JP); Daijiro Fujie, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/925,464

(22) Filed: Aug. 10, 2001

(65) Prior Publication Data

US 2002/0017509 A1 Feb. 14, 2002

(30) Foreign Application Priority Data

Aug. 10, 2000 (JP) ........................................ 2000-242367

(51) Int. Cl.⁷ .............................................. B23K 26/36
(52) U.S. Cl. .................................................. 219/121.78
(58) Field of Search ......................... 219/121.63, 121.64, 219/121.67, 121.68, 121.69, 121.72, 121.76, 121.77, 121.78

(56) References Cited

U.S. PATENT DOCUMENTS 6,008,469 A  * 12/1999 Kawamura et al.
6,294,754 B1 *  9/2001 Nagura et al.
2002/0017509 A1    2/2002 Nagura et al.

FOREIGN PATENT DOCUMENTS

JP          10-216972         8/1998

* cited by examiner

Primary Examiner—Samuel M. Heinrich
(74) Attorney, Agent, or Firm—Birch, Stewart, Kolasch & Birch, LLP

(57) ABSTRACT

A coaxial laser beam machining head, and a laser beam machining apparatus having it are provided. The head is small in size, free from the risk of damaging optical instruments, and inexpensive. The head comprises a collimating lens array, a first reflecting mirror for dividing laser light into a first divisional laser beam and a second divisional laser beam, a second reflecting mirror for further reflecting the first divisional laser beam to form a space portion between both divisional laser beams, a focusing lens array for focusing both divisional laser beams onto a portion to be welded, and a GMA electrode disposed in the space portion coaxially with the laser beams; or comprises a collimating lens array, a first reflecting mirror for reflecting part of laser light to form a space portion in a body of the laser light, a second reflecting mirror for further reflecting the part of the laser light, a focusing lens array for focusing the body of the laser light and the part of the laser light onto a portion to be welded, and a GMA electrode disposed in the space portion coaxially with the body of the laser light.

17 Claims, 12 Drawing Sheets

21 YAG Laser Oscillator
22 Laser Beam Machining Head
23 Multi-Axis NC Robot
24 Laser Light
24a Parallel Laser Beam
24b First Divisional Laser Beam
24c Second Divisional Laser Beam
24d Space Portion
25 Optical Fiber
26 Collimating Lens Array
27 First Reflecting Mirror
28 Second Reflecting Mirror
28b Turn Shaft
29 Focusing Lens Array
30 Outer Cylinder
31 Mirror Moving Device
32 Mirror Turning Device
33 GMA Electrode
34 Base Material
34a Portion to be Welded
35 GMA Head
36 GMA Welding Machine
37 Wire Feeder
38 Guide Tube

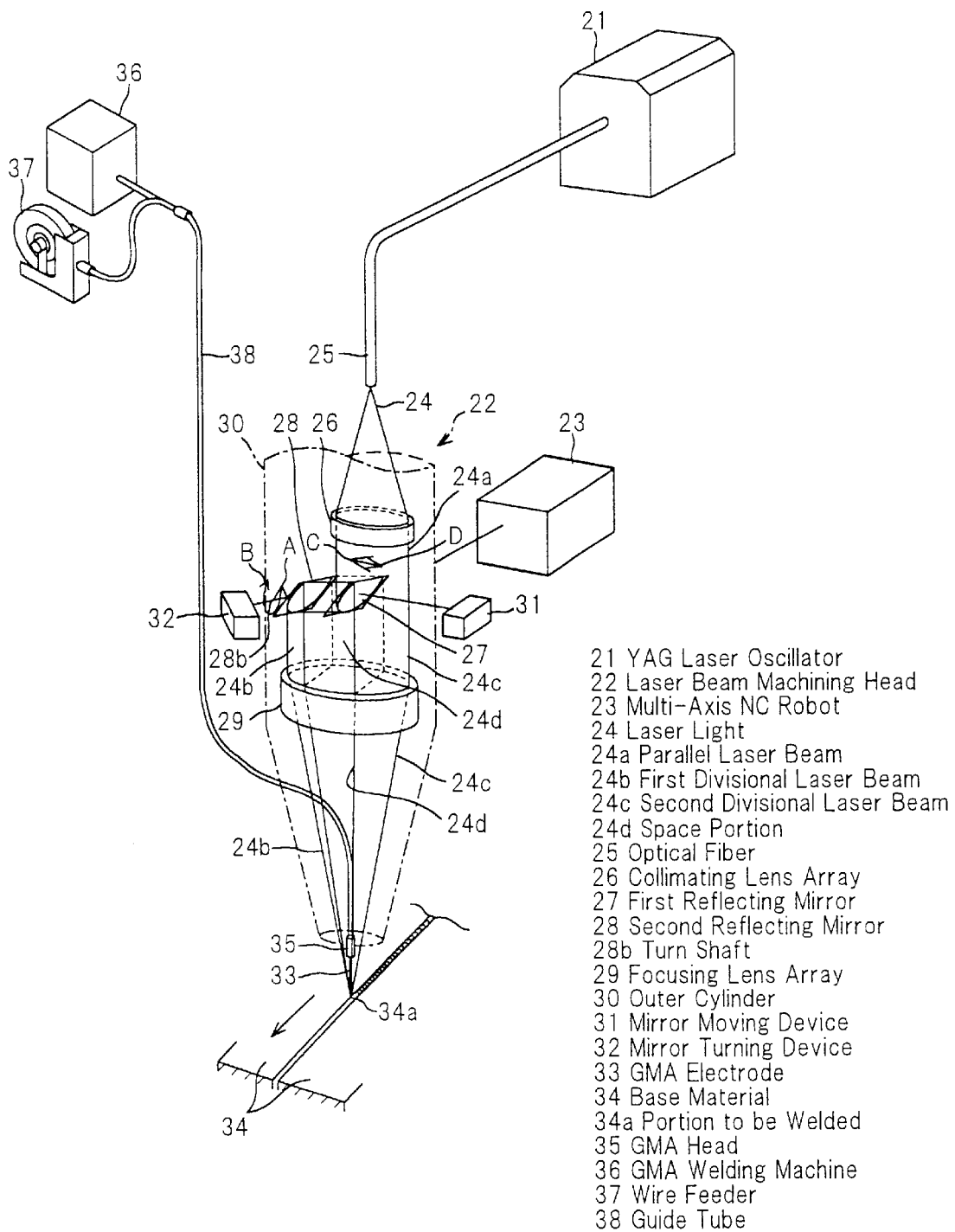

24 Laser Light
24a Parallel Laser Beam
24b First Divisional Laser Beam
24c Second Divisional Laser Beam
24d Space Portion
25 Optical Fiber
26 Collimating Lens Array
27 First Reflecting Mirror
27a Reflecting Surface
28 Second Reflecting Mirror
28a Reflecting Surface
29 Focusing Lens Array
31 Mirror Moving Device
32 Mirror Turning Device
33 GMA Electrode
35 GMA Head
38 Guide Tube 41 TIG Head
42 TIG Electrode
43 TIG Welding Machine
44 Guide Tube 51 Filler Wire Head
52 Filler Wire
53 Wire Feeder
61 Assist Gas Nozzle
62 Assist Gas Feeder 63 Guide Tube
71 Powder Nozzle
72 Powder Feeder
73 Guide Tube 24a Parallel Laser Beam
24b First Divisional Laser Beam
24c Second Divisional Laser Beam
24d Space Portion
27 First Reflecting Mirror
28 Second Reflecting Mirror
28b Turn Shaft
29 Focusing Lens Array
31 Mirror Moving Device
32 Mirror Turning Device
34 Base Material 24a Parallel Laser Beam
24b First Divisional Laser Beam
24c Second Divisional Laser Beam
24d Space Portion
27 First Reflecting Mirror
28 Second Reflecting Mirror
28b Turn Shaft
29 Focusing Lens Array
31 Mirror Moving Device
32 Mirror Turning Device
34 Base Material

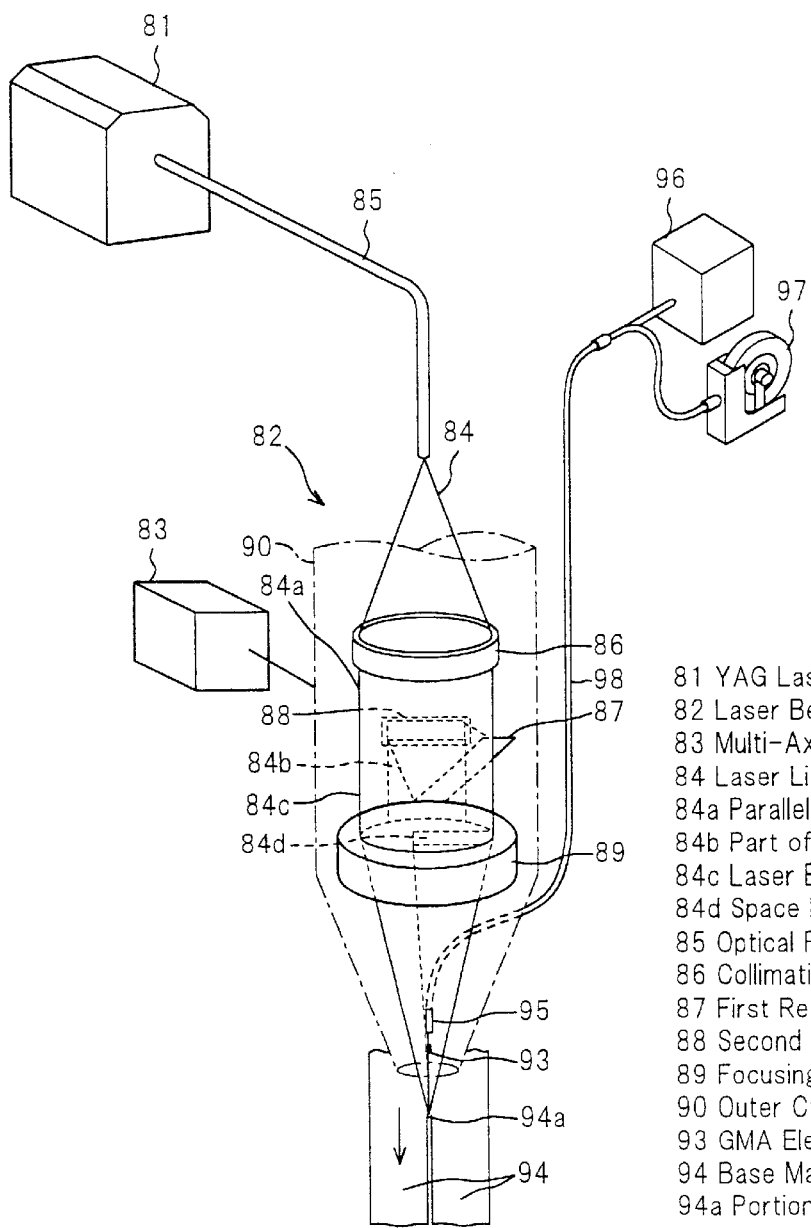

FIG. 6

81 YAG Laser Oscillator
82 Laser Beam Machining Head
83 Multi-Axis NC Robot
84 Laser Light
84a Parallel Laser Beam
84b Part of Laser Beam
84c Laser Beam Body
84d Space Portion
85 Optical Fiber
86 Collimating Lens Array
87 First Reflecting Mirror
88 Second Reflecting Mirror
89 Focusing Lens Array
90 Outer Cylinder
93 GMA Electrode
94 Base Material
94a Portion to be Welded
95 GMA Head
96 GMA Welding Machine
97 Wire Feeder
98 Guide Tube

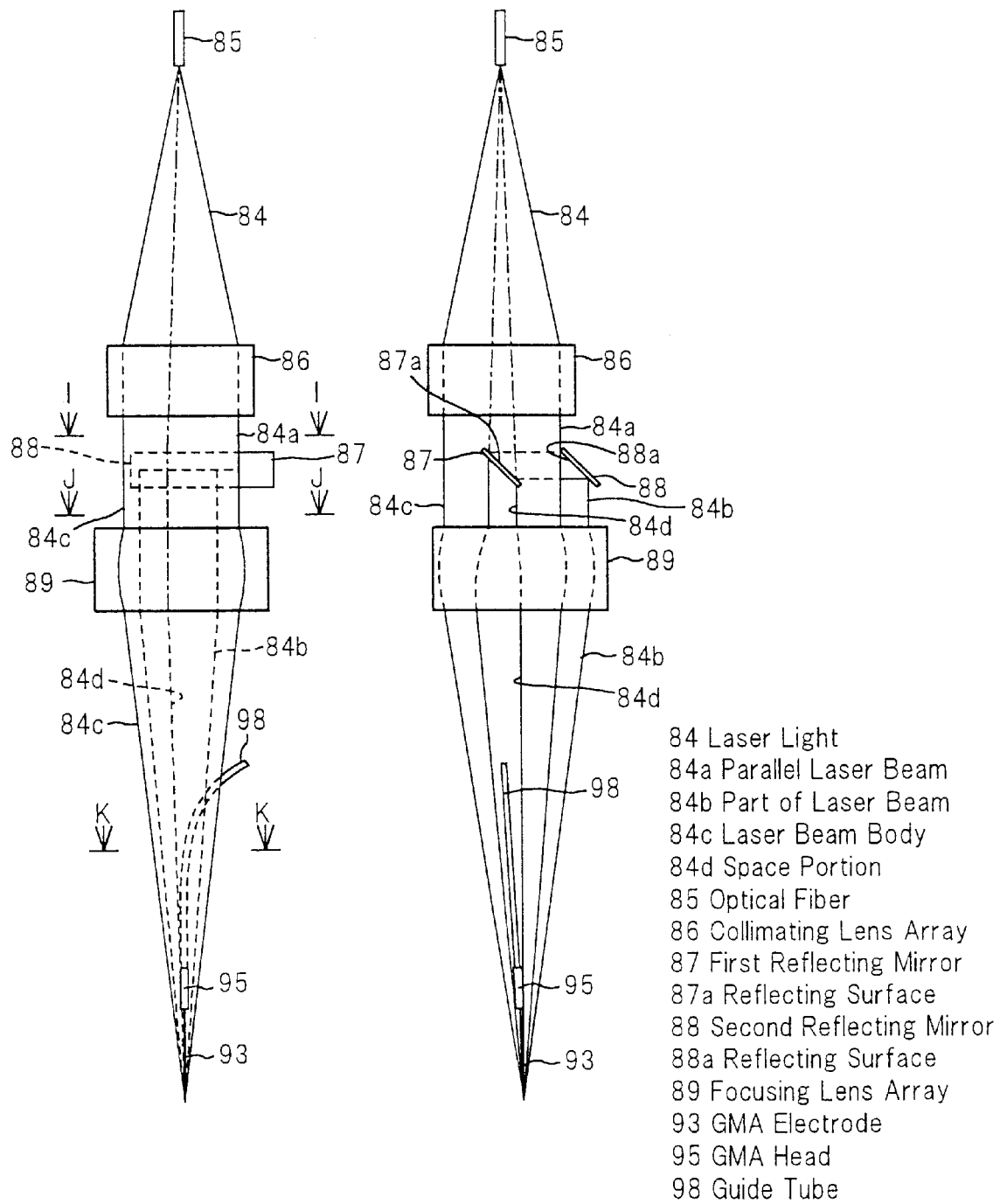

84b Part of Laser Beam
85 Optical Fiber
86 Collimating Lens Array
87 First Reflecting Mirror
87a Reflecting Surface
88 Second Reflecting Mirror
88a Reflecting Surface
89 Focusing Lens Array 84a Parallel Laser Beam
84b Part of Laser Beam
84c Laser Beam Body
84d Space Portion
87 First Reflecting Mirror
88 Second Reflecting Mirror
89 Focusing Lens Array
93 GMA Electrode From Collimating Lens Array To Focusing Lens Array 84a Parallel Laser Beam
84b Part of Laser Beam
84c Laser Beam Body
84d Space Portion
87 First Reflecting Mirror
87a Reflecting Surface
88 Second Reflecting Mirror
88a Reflecting Surface
89 Focusing Lens Array 1 Base Material
1a Portion to be Welded
2 Laser Beam Welding Head
3 Laser Light
4 GMA Welding Head
5 GMA Electrode
6 Gas Jet Nozzle 11 Optical Fiber
12 Laser Light
12a First Divisional Laser Beam
12b Second Divisional Laser Beam
13 Convex Roof Mirror
14 Concave Roof Mirror
14a Through-Hole
15 Focusing Lens Array
15a Through-Hole
16 Electrode Holding Pipe
17 Space Portion 103 Assist Gas Nozzle
103a Opening Tip Portion
104 Laser Light
105 Focusing Lens Array
106 Base Material
106a Portion to be Cut

LASER BEAM MACHINING HEAD AND LASER BEAM MACHINING APPARATUS HAVING SAME

The entire didclosure of Japanese Patent Applicaiton No. 2000-242367 filed on Aug. 10, 2000 including specification, claims, drawings and summary is incorporated herein by reference in its entirety.

BACKGROUND OF THE INVENTION

1. Field of the Invention

This invention relates to a laser beam machining head and a laser beam machining apparatus equipped with it, which are useful when applied in performing laser beam welding and arc welding at the same time.

2. Description of the Related Art

Among welding techniques for joining metals together are laser beam welding and arc welding. Laser beam welding is performed using a $CO_2$ laser oscillator or a YAG laser oscillator. $CO_2$ laser light has to be mirror transmitted, and thus its adjustment is laborious, while YAG laser light can be transmitted by an optical fiber. Under these circumstances, expectations are rising for laser beam welding using a YAG laser oscillator. Arc welding comes in types, including gas shielded consumable electrode arc welding (GMA welding) such as MIG welding, and gas shielded non-consumable electrode arc welding such as TIG welding.

Since laser light is condensed by optical instruments to give a high energy density, laser beam welding achieves deep weld penetration in a narrow range of melting. With arc welding such as GMA welding (MIG welding, etc.) or TIG welding, on the other hand, the arc spreads in a relatively broad range, thus performing welding of a wide bead range, and enabling welding with a high groove tolerance. In recent years, therefore, methods for simultaneously performing laser beam welding and arc welding have been studied in attempts to carry out welding with a wide welding range and a deep weld penetration.

A laser beam machining head, which performs laser beam welding and arc welding simultaneously, has a configuration, for example, disclosed in Japanese Unexamined Patent Publication No. 1998-216972. As shown in FIG. 11, this laser beam machining head performs laser beam welding and arc welding by applying laser light 3 from a laser beam welding head 2 to a portion 1a, to be welded, of a base material 1, and simultaneously applying an arc discharge from an electrode 5 of a GMA welding head 4, while jetting a shielding gas at the portion 1a from a gas jet nozzle 6. However, this laser beam machining head is large in size as a whole, since the laser beam welding head 2 and the GMA welding head 4 are independent in the laser beam machining head. Moreover, it is tiresome to keep the relative positional relationship between the laser beam welding head 2 and the GMA welding head 4 always constant in response to a change in the welding position or the welding posture. Thus, the laser beam machining head is not suitable, particularly, for three-dimensional machining by a robot.

The inventors of the present invention proposed in Japanese Unexamined Patent Publication No. 1999-156573 a laser beam machining head capable of solving the above-described problems. In this laser beam machining head, as shown in FIG. 12 of the present drawings, laser light 12 transmitted by an optical fiber 11 is reflected by a convex roof mirror 13 and a concave roof mirror 14, and divided thereby into two divisional beams, a first divisional laser beam 12a and a second divisional laser beam 12b, with a space portion 17 being formed therebetween. These divisional laser beams 12a and 12b are focused by a focusing lens array 15 onto a portion to be welded. The concave roof mirror 14 and the focusing lens array 15 are perforated, at the center thereof, with through-holes 14a and 15a, respectively. An electrode holding pipe 16 for holding an arc electrode, such as a TIG electrode or a GMA electrode, is inserted through the through-holes 14a, 15a, whereby the arc electrode held by the electrode holding pipe 16 is located in the space portion 17 between the divisional laser beams 12a and 12b and rendered coaxial with these laser beams. With the above-mentioned conventional coaxial laser beam machining head, the through-holes 14a and 15b are provided in the concave roof mirror 14 and the focusing coaxial arrangement takes much time, effort and expense, and the sites of the through-holes 14a, 15b are easily damaged. Furthermore, the convex roof mirror 13 and the concave roof mirror 14 are used to divide the laser light 12 into two beams, but these concave and convex roof mirrors 13 and 14 are very expensive.

SUMMARY OF THE INVENTION

The present invention has been accomplished to solve the above problems, and its object is to provide a coaxial laser beam machining head which is small in size, free from the risk of damaging optical instruments, and inexpensive, and a laser beam machining apparatus having this head.

A laser beam machining head, as a first aspect of the present invention for attaining the above object, comprises:

one collimating optical system for making laser light into a parallel beam;

a first reflecting mirror for reflecting part of the laser light made into the parallel beam by the collimating optical system to divide the laser light into two beams, a first divisional laser beam and a second divisional laser beam;

a second reflecting mirror for further reflecting the first divisional laser beam reflected by the first reflecting mirror to form a space portion between the first divisional laser beam and the second divisional laser beam;

one focusing optical system for focusing the first divisional laser beam and the second divisional laser beam onto a portion to be machined; and a tip machining portion of machining means disposed in the space portion between the first divisional laser beam and the second divisional laser beam coaxially with the laser beams.

The above laser beam machining head of the first aspect is very small in size, inexpensive, and free from the risk of damage to the optical instruments, in comparison with the conventional laser beam machining head. This laser beam machining head is so small in size that it can be easily mounted, for example, to a multi-axis NC robot. Moreover, the tip machining portion of the machining means and the laser light (the first and second divisional laser beams) are coaxial. Thus, the laser beam machining head can be easily positioned and moved to an arbitrary position by the multi-axis NC robot, and three-dimensional machining can be performed with ease. Also, if the tip machining portion of the machining means is a GMA electrode, coaxial welding by this GMA electrode and the laser light makes welding at a very high speed possible. In addition, irradiation with laser light can stabilize an arc. Thus, welding of an SUS material or a high Cr material in a pure Ar gas atmosphere becomes possible, without the use of a special wire.

A laser beam machining head as a second aspect of the invention is the laser beam machining head of the first aspect, wherein the second reflecting mirror is rendered normally and reversely rotatable, whereby spacing between a focused tip of the first divisional laser beam and a focused tip of the second divisional laser beam is adjustable.

According to the laser beam machining head of the second aspect, the rotation angle of the second reflecting mirror is set as desired to widen the spacing between the focused tip of the first divisional laser beam and the focused tip of the second divisional laser beam to a suitable degree, whereby a base material with a broad gap width can be welded.

A laser beam machining head as a third aspect of the invention is the laser beam machining head of the first aspect, wherein the first reflecting mirror is rendered movable, whereby the division ratio for the first divisional laser beam and the second divisional laser beam can be adjusted, and the second reflecting mirror is rendered normally and reversely rotatable, whereby the spacing between the focused tip of the first divisional laser beam and the focused tip of the second divisional laser beam can be adjusted.

According to the laser beam machining head of the third aspect, the moving position of the first reflecting mirror is set as desired to decrease the proportion of the first divisional laser beam to a suitable degree and increase the proportion of the second divisional laser beam to a suitable degree, and the rotation angle of the second reflecting mirror is set as desired to widen the spacing between the focused tip of the first divisional laser beam and the focused tip of the second divisional laser beam to a suitable degree, whereby the second divisional laser beam is first applied to the base material with a deep weld penetration, and then the first divisional laser beam is applied to form an adequate bead. On this occasion, satisfactory welding without porosity (voids) can be performed.

A laser beam machining head as a fourth aspect of the invention is the laser beam machining head of the first, second or third aspect, wherein the optical axis of the collimating optical system and the optical axis of the focusing optical system are displaced in a direction perpendicular to the optical axes, whereby the collimating optical system is moved over toward one side relative to the focusing optical system so that the first divisional laser beam reflected by the first and second reflecting mirrors is entered into the other side of the focusing optical system.

According to the laser beam machining head of the fourth aspect, as compared with the agreement between the optical axis of the collimating optical system and the optical axis of the focusing optical system, the first divisional laser beam and the second divisional laser beam can be focused even by the focusing optical system of a smaller diameter, and the entire laser beam machining head can be made smaller in size.

A laser beam machining head as a fifth aspect of the invention comprises:

one collimating optical system for making laser light into a parallel beam;

a reflecting mirror for reflecting part of the laser light made into the parallel beam by the collimating optical system to withdraw the part of the laser light out of a body of the laser light, thereby forming a space portion in the body of the laser light;

one focusing optical system for focusing the body of the laser light, where the space portion has been formed, onto a portion to be machined; and a tip machining portion of machining means disposed in the space portion of the body of the laser light coaxially with the body of the laser light.

The laser beam machining head of the fifth aspect is very small in size, inexpensive, and free from the risk of damage to the optical instruments, in comparison with the conventional laser beam machining head. This laser beam machining head is so small in size that it can be easily mounted to a multi-axis NC robot. Moreover, the tip machining portion of the machining means and the body of laser light are coaxial. Thus, the laser beam machining head can be easily positioned and moved to an arbitrary position by the multi-axis NC robot, and three-dimensional machining can be performed with ease. Also, if the tip machining portion of the machining means is a GMA electrode, coaxial welding makes welding at a very high speed possible. In addition, welding of an SUS material or a high Cr material in a pure Ar gas atmosphere becomes possible.

A laser beam machining head as a sixth aspect of the invention comprises:

one collimating optical system for making laser light into a parallel beam;

a first reflecting mirror for reflecting part of the laser light made into the parallel beam by the collimating optical system to withdraw the part of the laser light out of a body of the laser light, thereby forming a space portion in the body of the laser light;

a second reflecting mirror located outside the body of the laser light and adapted to reflect the part of the laser light reflected by the first reflecting mirror so as to be parallel to the body of the laser light and be in contact with or in proximity to the outer peripheral surface of the body of the laser light;

one focusing optical system for focusing the body of the laser light, where the space portion has been formed by the first reflecting mirror, and the part of the laser light reflected by the first and second reflecting mirrors, onto a portion to be machined; and a tip machining portion of machining means disposed in the space portion of the body of the laser light coaxially with the body of the laser light.

The laser beam machining head of the sixth aspect is very small in size, inexpensive, and free from the risk of damage to the optical instruments, in comparison with the conventional laser beam machining head. This laser beam machining head is so small in size that it can be easily mounted to a multi-axis NC robot. Moreover, the tip machining portion of the machining means and the body of laser light are coaxial. Thus, the laser beam machining head can be easily positioned and moved to an arbitrary position by the multi-axis NC robot, and three-dimensional machining can be performed with ease. Also, if the tip machining portion of the machining means is a GMA electrode, coaxial welding makes welding at a very high speed possible. In addition, welding of an SUS material or a high Cr material in a pure Ar gas atmosphere becomes possible. Furthermore, part of the laser light taken out of the body of the laser light by the first reflecting mirror is further reflected by the second reflecting mirror, and focused to the portion to be machined, together with the body of the laser light, by the focusing optical system. Thus, the energy of the laser light is not wasted, but can be effectively used, minimizing a loss of the laser light.

A laser beam machining head as a seventh aspect of the invention is the laser beam machining head of the sixth aspect, wherein the first reflecting mirror is inserted into the laser light, which has been made into the parallel beam by the collimating optical system, along a diametrical direction of a cross sectional plane of the laser light and obliquely relative to the optical axis of the laser light, and is also inclined in a direction perpendicular to the direction of insertion of the first reflecting mirror, whereby part of the laser light is reflected obliquely to the outside of the body of the laser light.

According to the laser beam machining head of the seventh aspect, part of the laser light taken out of the body of the laser light is located just beside the body of the laser light. Thus, as compared with part of the laser light being located at a position displaced from the position just beside the body of the laser light, the diameter of the focusing optical system can be rendered smaller, and the entire laser beam machining head can be made smaller in size.

A laser beam machining head as an eighth aspect of the invention is the laser beam machining head of the sixth or seventh aspect, wherein the optical axis of the collimating optical system and the optical axis of the focusing optical system are displaced in a direction perpendicular to the optical axes, whereby the collimating optical system is moved over toward one side relative to the focusing optical system so that part of the laser light reflected by the first and second reflecting mirrors is entered into the other side of the focusing optical system.

According to the laser beam machining head of the eighth aspect, as compared with the agreement between the optical axis of the collimating optical system and the optical axis of the focusing optical system, the body of the laser light and part of the laser light can be focused even by the focusing optical system of a smaller diameter, and the entire laser beam machining head can be made smaller in size.

A laser beam machining head as a ninth aspect of the invention is the laser beam machining head of the first, second, third, fourth, fifth, sixth, seventh or eighth aspect, wherein the tip machining portion of the machining means is a GMA electrode, a TIG electrode, a filler wire, an assist gas nozzle, or a powder nozzle.

The laser beam machining head of the ninth aspect is so small in size that it can be easily mounted to a multi-axis NC robot. Moreover, the laser beam machining head can be easily positioned and moved to an arbitrary position by the multi-axis NC robot. Furthermore, the laser beam machining head is inexpensive, and free from the risk of damaging the optical instruments.

A laser beam machining head as a tenth aspect of the invention is the laser beam machining head of the first, second, third, fourth, fifth, sixth, seventh or eighth aspect, wherein the tip machining portion of the machining means is an assist gas nozzle, and the assist gas nozzle is a divergent nozzle.

According to the laser beam machining head of the tenth aspect, the assist gas can be jetted at a very high speed, so that the cutting speed or the drilling speed increases markedly.

A laser beam machining apparatus as an eleventh aspect of the invention comprises:

the laser beam machining head of the first, second, third, fourth, fifth, sixth, seventh, eighth, ninth or tenth aspect;

a laser oscillator for oscillating laser light;

laser light transmission means for transmitting the laser light oscillated by the laser oscillator to the laser beam machining head; and laser beam machining head moving means for positioning and moving the laser beam machining head to an arbitrary position.

The laser beam machining apparatus of the eleventh aspect is an inexpensive laser beam machining apparatus with excellent ability at machining, such as welding or cutting.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a perspective view showing a system configuration of a laser beam machining apparatus according to Embodiment 1 of the present invention;

FIG. 6 is a perspective view showing a system configuration of a laser beam machining apparatus according to Embodiment 2 of the present invention;

FIGS. 7A and 7B are side views showing the configuration of an essential part of a laser beam machining head provided in the laser beam machining apparatus, FIG. 7A being a view as viewed in a direction of an arrow G in FIG. 9A, and FIG. 7B being a view as viewed in a direction of an arrow H in FIG. 9B;

FIGS. 10A to 10D are explanation drawings showing other arrangement examples of reflecting mirrors, in which FIG. 10A is a side view, FIG. 10B is a view as viewed from a direction of L in FIG. 10A, FIG. 10C is a sectional view taken on line M—M of FIG. 10A, and FIG. 10D is a sectional view taken on line N—N of FIG. 10A;

DESCRIPTION OF THE PREFERRED EMBODIMENTS

Embodiments of the present invention will now be described in detail with reference to the accompanying drawings.

[Embodiment 1]

Figure 2A:
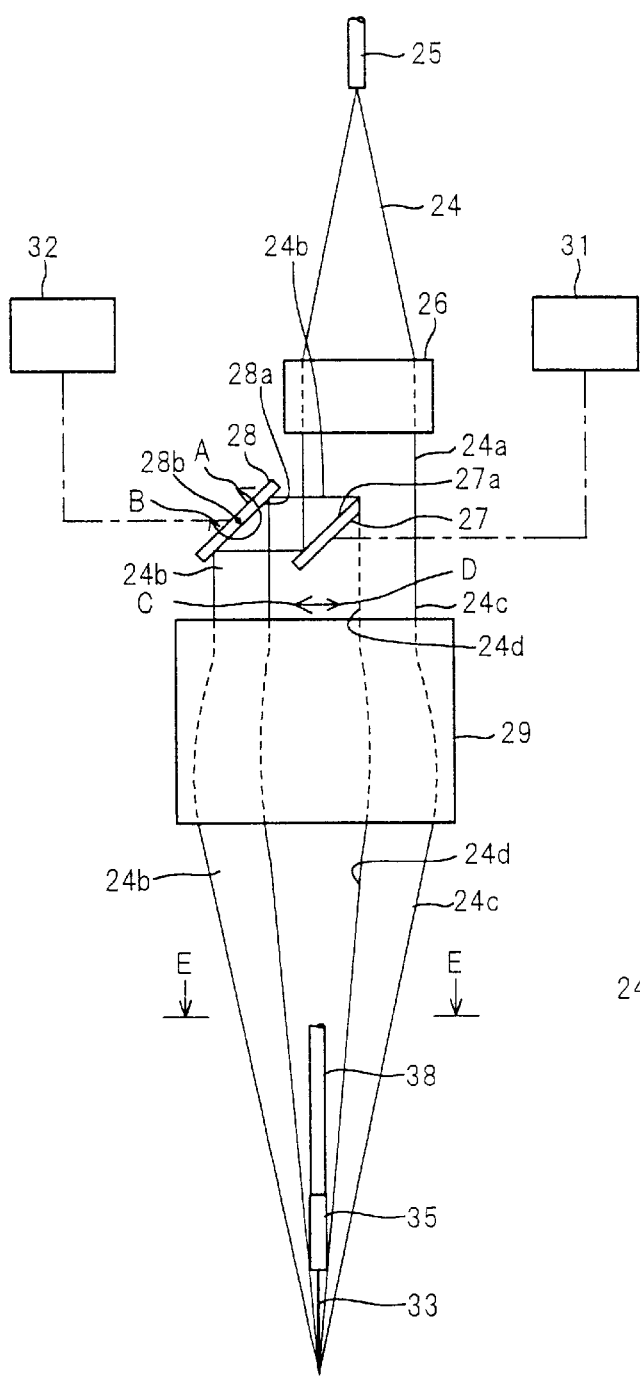
FIG. 2A is a side view showing the configuration of an essential part of a laser beam machining head provided in the laser beam machining apparatus.
Figure 2B:
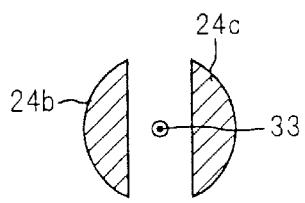
FIG. 2B is a sectional view taken on line E—E of FIG. 2A.
Figure 4:
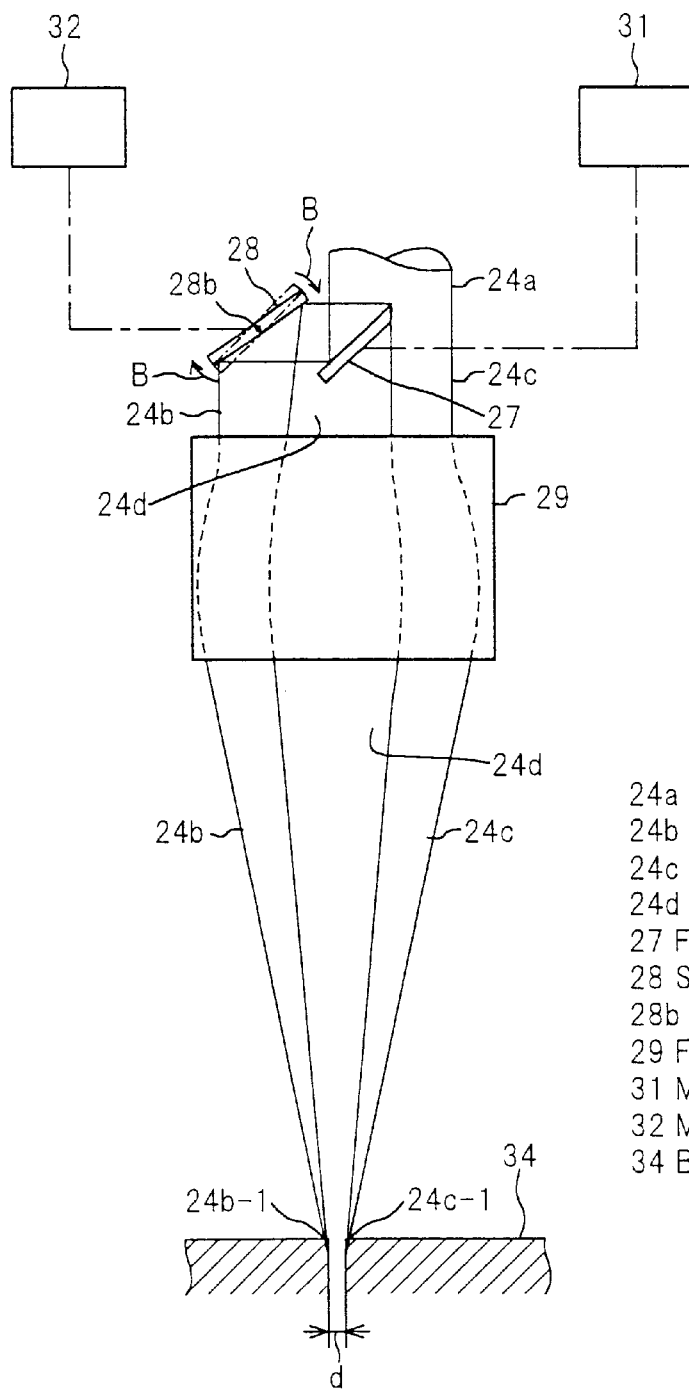
FIG. 4 is an explanation drawing showing a state in which focused tips of laser beams formed by division in the laser beam machining head are spaced.
Figure 5:
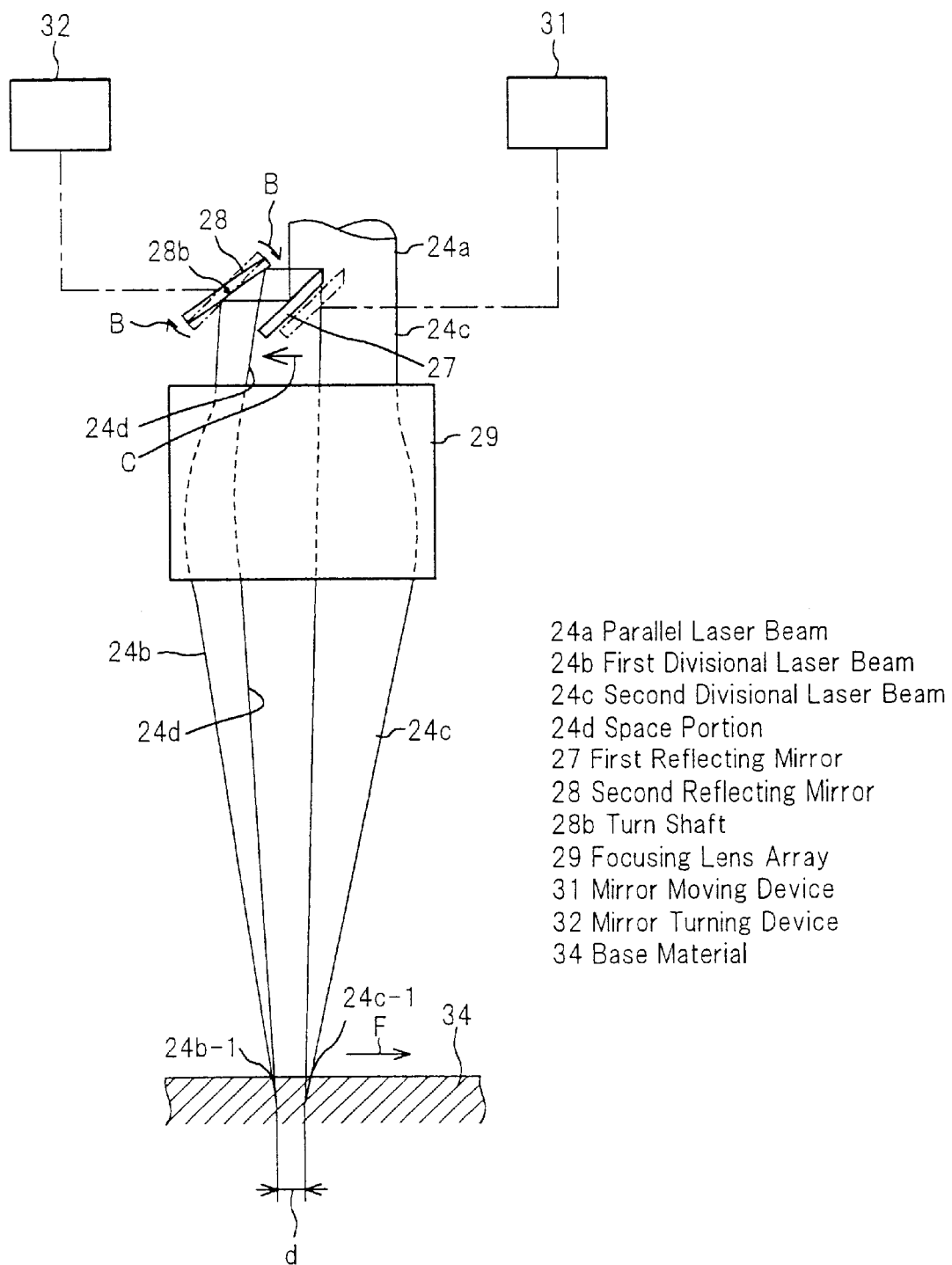
FIG. 5 is an explanation drawing showing a state in which the division ratio for laser beams formed by division in the laser beam machining head is changed, and the focused tips of the laser beams are spaced.

FIG. 1 is a perspective view showing a system configuration of a laser beam machining apparatus according to Embodiment 1 of the present invention. FIG. 2A is a side view showing the configuration of an essential part of a laser beam machining head provided in the laser beam machining apparatus, and FIG. 2B is a sectional view taken on line E—E of FIG. 2A. FIGS. 3A to 3E are perspective views showing various machining means provided in the laser beam machining apparatus. FIG. 4 is an explanation drawing showing a state in which focused tips of laser beams formed by division in the laser beam machining head are spaced. FIG. 5 is an explanation drawing showing a state in which the division ratio for laser beams formed by division in the laser beam machining head is changed, and the focused tips of the laser beams are spaced.

<Configuration>

As shown in FIG. 1, a laser beam machining apparatus according to the present Embodiment 1 is equipped with a YAG laser oscillator 21, an optical fiber 25 as laser beam transmission means, a laser beam machining head 22, and a multi-axis NC robot 23 as laser beam machining head moving means.

Laser light 24 oscillated from the YAG laser oscillator 21 is transmitted to an input portion of the laser beam machining head 22 by the optical fiber 25. The laser beam machining head 22 is mounted to the multi-axis NC robot 23, and positioned and moved to an arbitrary position by the multi-axis NC robot 23. The laser beam machining head 22 has in an outer cylinder 30 a collimating lens array 26 as one collimating optical system, a first reflecting mirror 27, a second reflecting mirror 28, a focusing lens array 29 as one focusing optical system, and a GMA electrode (MIG electrode or the like) 33 as a tip machining portion of GMA welding means (MIG welding means or the like). When the second reflecting mirror 28 is to be normally and reversely rotatable, a mirror turning device 32 comprising an electric motor or the like is provided as mirror turning means. When the first reflecting mirror 27 is to be made movable, moreover, a mirror moving device 31 comprising an electric motor or the like is provided as mirror moving means.

A detailed description of the laser beam machining head 22 will be offered based on FIGS. 1, 2A and 2B. The collimating lens array 26 is composed of a plurality of lenses arranged in series for making the laser light 24, which has been transmitted by the optical fiber 25, into a parallel beam. The first reflecting mirror 27 and the second reflecting mirror 28 are disposed below the collimating lens array 26 in the drawings, and the focusing lens array 29 is disposed below these reflecting mirrors 27 and 28 in the drawings.

The first reflecting mirror 27 is a flat mirror, and is inserted into a laser beam 24a, which has been rendered parallel by the collimating lens array 26, in a direction perpendicular to the optical axis of the laser beam 24a as far as a central part of a cross sectional plane of the laser beam 24a, and a reflecting surface 27a of the first reflecting mirror 27 is inclined upward (toward the collimating lens array) and outward (leftward in the drawings). Thus, the first reflecting mirror 27 reflects part of the laser beam 24a (a left half thereof in the drawings) outward (leftward in the drawings) to divide the laser beam 24a into two halves, i.e., a first divisional laser beam 24b and a second divisional laser beam 24c.

The second reflecting mirror 28 is a flat mirror similar to the first reflecting mirror 27. The second reflecting mirror 28 is disposed sideways of the first reflecting mirror 27, and has a reflecting surface 28a inclined downward (toward the focusing lens array) and toward the first reflecting mirror 27 (rightward in the drawings). Thus, according to the second reflecting mirror 28, the first divisional laser beam 24b reflected by the first reflecting mirror 27 is further reflected downward in the drawings parallel to the second divisional laser beam 24c to form a space portion (spacing) 24d between the first divisional laser beam 24b and the second divisional laser beam 24c.

The focusing lens array 29 is composed of a plurality of lenses arranged in series, and focuses the first divisional laser beam 24b, which has been reflected by the first and second reflecting mirrors 27 and 28, and the second divisional laser beam 24c, which has been transmitted as such downwardly in the drawings without being reflected by the first reflecting mirror 27, onto a portion 34a, to be welded, of a base material 34. At this time, the first divisional laser beam 24b and the second divisional laser beam 24c are focused to one point. That is, the laser beam 24a is a parallel beam. Thus, even if the optical path lengths of the first divisional laser beam 24b and the second divisional laser beam 24c are different between the collimating lens array 26 and the focusing lens array 29, these divisional laser beams 24b and 24c can be focused to the one point by the focusing lens array 29.

The focusing lens array 29 is somewhat greater in diameter than the collimating lens array 26. The optical axis of the collimating lens array 26 and the optical axis of the focusing lens array 29 are displaced in a direction perpendicular to these optical axes, whereby the collimating lens array 26 is brought to one side (right side in the drawings) relative to the focusing lens array 29, and the first divisional laser beam 24b reflected by the first and second reflecting mirrors 27 and 28 is entered into the other side (left side in the drawings) of the focusing lens array 29.

Because of the above configuration, the second divisional laser beam 24c transmitted straightly from the collimating lens array 26 to the focusing lens array 29, and the first divisional laser beam 24b separated in a direction perpendicular to the optical axis with respect to the second divisional laser beam 24c (i.e., in a leftward direction in the drawings) are incident on the single focusing lens array 29. Since the single focusing lens array 29 focuses both of the divisional laser beams 24b and 24c, the entire laser beam machining head is very small in size. The diameter of the focusing lens array 29 is, for example, about 70 mm.

On the output side of the focusing lens array 29 (the lower side in the drawings), the GMA electrode 33 is supported by the outer cylinder 30, and disposed in the space portion 24d between the first divisional laser beam 24b and the second divisional laser beam 24c coaxially with these laser beams. According to this configuration, GMA/YAG coaxial welding is possible. GMA welding means performs power supply and feeding of an inert gas from a GMA welding machine 36 to a GMA head 35 at the tip via a guide tube 38, and feeding of the GMA electrode (filler wire) 33 from a wire feeder 37, thereby carrying out GMA welding. Instead of the GMA welding means, a tip machining portion of any other machining means as shown in FIGS. 3A to 3E may be disposed in the space portion 24d between the first divisional laser beam 24b and the second divisional laser beam 24c.

Figure 3A:
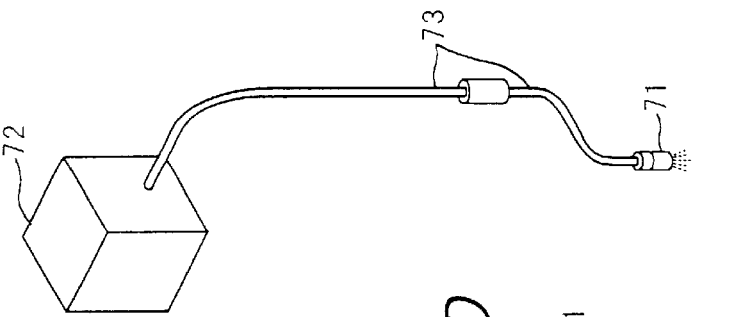
FIGS. 3A to 3E are perspective views showing various machining means provided in the laser beam machining apparatus.

In TIG welding means shown in FIG. 3A, a TIG (tungsten) electrode 42 is held by a TIG head 41, and fed with an electric power and an inert gas from a TIG welding machine 43 via a guide tube 44 to perform TIG welding. In this case, the TIG electrode 42 is disposed in the space portion 24d between the first divisional laser beam 24b and the second divisional laser beam 24c coaxially with these laser beams. In this condition, laser beam welding and TIG welding are performed simultaneously.

Figure 3B:

In filler wire feeding means shown in FIG. 3B, a filler wire 52 is fed to a filler wire head 51 at the tip from a wire feeder 53 via a guide tube 54. In this case, the TIG electrode 42 is disposed in the space portion 24d between the first divisional laser beam 24b and the second divisional laser beam 24c coaxially with these laser beams. In this condition, laser light is applied, with the filler wire 52 being fed to the portion to be welded, to perform laser beam welding.

Figures 3C, 3D:
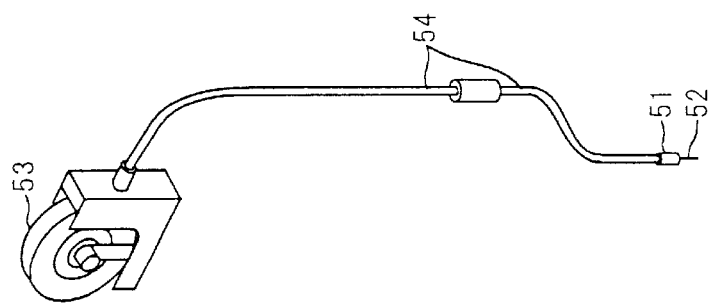
Figure 13:
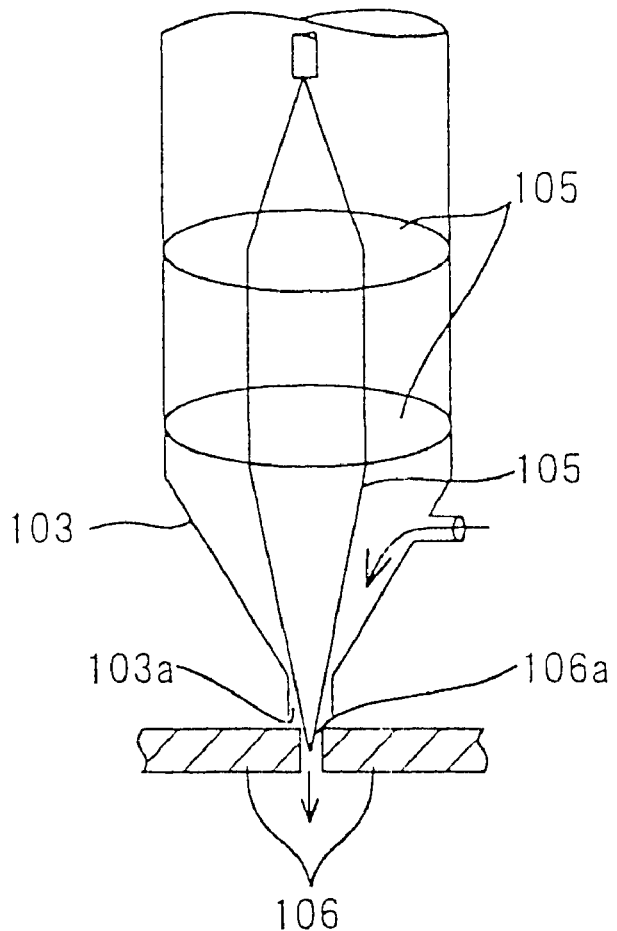
FIG. 13 is a configuration drawing of a conventional coaxial assist gas nozzle.

In assist gas feeding means shown in FIG. 3C, an assist gas fed from an assist gas feeder 62 via a guide tube 63 is jetted from an assist gas nozzle 61 located at the tip. In this case, the assist gas nozzle 61 is disposed in the space portion 24d between the first divisional laser beam 24b and the second divisional laser beam 24c coaxially with these laser beams. In this condition, laser light is applied to a portion to be cut or drilled, with the assist gas being jetted at the portion to be cut or drilled, to perform laser beam cutting or drilling. Desirably, the assist gas nozzle 61 is a nozzle of a shape having a channel once narrowed and then widened, as shown in FIG. 3D. Such a nozzle is generally known as a divergent nozzle in the field of gas cutting. So far, there has been a configuration, as shown in FIG. 13, in which an assist gas nozzle 103 is provided so as to surround the periphery of laser light 104 focused by a focusing lens array 105, and an assist gas is jetted from an opening tip portion 103a of the assist gas nozzle 103 toward a portion 106a, to be cut, of a base material 106. To increase the flow velocity of the assist gas, or to feed the assist gas efficiently to the portion 106a to be cut, it has been attempted to thin the opening tip portion 103a. However, there have been limits, because interference with laser light has to be avoided. Even if it is tried to raise the pressure of the assist gas, this pressure will act on protective glass (not shown) of the focusing lens array 105. The necessity for avoiding damage to the protective glass has also imposed limits. On the other hand, when the assist gas nozzle 61 is disposed in the space portion 24d between the first divisional laser beam 24b and the second divisional laser beam 24c coaxially with these laser beams, as stated above, the assist gas nozzle 61 can be thinned to a desirable degree. Thus, the flow velocity of the assist gas can be increased, or the assist gas can be efficiently fed to the portion to be cut. Also, the assist gas can be brought to a desired pressure to increase the flow velocity and the flow rate. Furthermore, a divergent nozzle can be employed as the assist gas nozzle 61, so that the assist gas can be jetted at a very high speed, thereby increasing the cutting speed remarkably. To cut a 100 mm thick metal plate, for example, a conventional coaxial assist gas nozzle as illustrated in FIG. 13 gave a cutting speed of about 0.05 m/min with the use of, for example, 8 kw laser light. By contrast, the coaxial assist gas nozzle according to the present embodiment achieves a high cutting speed of 0.1 m/min with 4 kw laser light, for example.

Figure 3E:
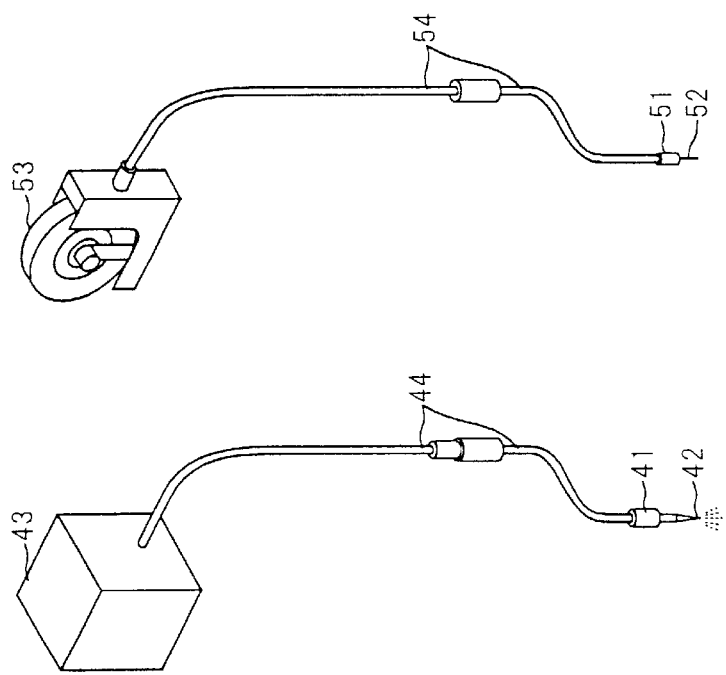

In powder feeding means shown in FIG. 3E, a powder of a metal (such as iron, stainless steel, or aluminum) fed from a powder feeder 72 via a guide tube 73 is ejected from a powder nozzle 71 located at the tip. In this case, the powder nozzle 71 is disposed in the space portion 24d between the first divisional laser beam 24b and the second divisional laser beam 24c coaxially with these laser beams. In this condition, laser light is applied to the metal powder, with the metal powder being ejected from the powder nozzle 71, to form an arbitrary three-dimensional shape.

As shown in FIGS. 1, 2A and 2B, the mirror turning device 32 rotates the second reflecting mirror 28 in a direction of an arrow A or the opposite direction of an arrow B about a center shaft 28b. Thus, when the second reflecting mirror 28 is rotated in the direction of the arrow B by the mirror turning device 32 as shown in FIG. 4, the angle of reflection of the first divisional laser beam 24b by the second reflecting mirror 28 is changed to provide spacing d between a focused tip 24b-1 of the first divisional laser beam 24b and a focused tip 24c-1 of the second divisional laser beam 24c. This spacing d can be set, as desired, by adjusting the rotation angle of the second reflecting mirror 28.

As shown in FIGS. 1, 2A and 2B, moreover, the mirror moving device 31 moves the first reflecting mirror 27 in a direction perpendicular to the optical axis of the laser beam 24a (i.e., in a direction of an arrow C or the opposite direction of an arrow D). Hence, when the first reflecting mirror 27 is moved in the direction of the arrow C by the mirror moving device 31 as shown in FIG. 5, the proportion of the first divisional laser beam 24b reflected by the first reflecting mirror 27 decreases, while the proportion of the second divisional laser beam 24c increases. This division ratio can be set, as desired, by adjusting the position to which the first reflecting mirror 27 is moved. When the second reflecting mirror 28 is rotated simultaneously in the direction of the arrow B by the mirror turning device 32, the spacing d between the focused tip 24b-1 of the first divisional laser beam 24b and the focused tip 24c-1 of the second divisional laser beam 24c is enlarged.

The movement of the first reflecting mirror 27 or the rotation of the second reflecting mirror 28 is not necessarily restricted to performance by the mirror moving device 31 or the mirror turning device 32, but may be performed manually.

<Actions and Effects>

According to the present Embodiment 1, as described above, the laser beam machining head 22 is composed of the single collimating lens array 26 for making the laser light 24 into a parallel beam; the first reflecting mirror 27 for reflecting part of the laser beam 24a made parallel by the collimating lens array 26 to divide the laser beam 24a into the first divisional laser beam 24b and the second divisional laser beam 24c; the second reflecting mirror 28 for further reflecting the first divisional laser beam 24b reflected by the first reflecting mirror 27 to provide the space portion 24d between the first divisional laser beam 24b and the second divisional laser beam 24c; the single focusing lens array 29 for focusing the first divisional laser beam 24b and the second divisional laser beam 24c onto the portion 34a to be cut; and the GMA electrode 33 disposed in the space portion 24d between the first divisional laser beam 24b and the second divisional laser beam 24c coaxially with the laser beams. Thus, the laser beam machining head 22 obtains the following actions and effects:

Compared with a conventional laser beam machining head in which a laser beam welding head and a GMA welding head are independent, in which perforated lenses are used for coaxial arrangement, or in which concave and convex roof mirrors are used to divide laser light into two beams, the present laser beam machining head 22 is very small in size and inexpensive, and is free from the risk of damaging optical instruments. The inventors have also developed a laser beam machining head in which laser light is divided by a triangular pyramidal mirror into two beams, and these divisional laser beams are focused by individual focusing lens arrays. In this case, the width of the entire laser beam machining head is, for example, as large as about 300 mm. Compared with such a laser beam machining head, the present laser beam machining head 22, configured to focus both of the divisional laser beams 24b and 24c by the single focusing lens array 29, is very compact. Since the laser beam machining head 22 is very compact, it can be easily mounted on the multi-axis NC robot 23. Since the GMA electrode 33 and the YAG laser light 24 (divisional laser beams 24b, 24c) are coaxial, moreover, the laser beam machining head 22 can be easily positioned and moved to an arbitrary position by the multi-axis NC robot 23, and can perform three-dimensional machining easily.

Furthermore, welding can be performed at a very high speed by coaxial welding using the GMA electrode 33 and the YAG laser light 24 (divisional laser beams 24b, 24c). For example, the welding speed was about 0.4 mm/s with conventional GMA welding. Whereas GMA/YAG coaxial welding permits high speed welding at 2 mm/s. A main reason why high speed welding is possible is that the metal (base material 34) evaporates upon irradiation with the divisional laser beams 24b, 24c, and partly ionizes (into Fe ions, Cr ions, Ni ions), whereupon an arc discharge is induced in the resulting ions to stabilize the arc. If it is attempted to achieve high speed welding merely by GMA welding without applying the divisional laser beams 24b, 24c, the arc runs shakily and becomes very unstable when the GMA electrode 33 is moved at a high speed. Thus, a continuous bead is not formed, so that high speed welding is impossible. When the divisional laser beams 24b, 24c are applied, on the other hand, the arc is stable even during high speed movement of the GMA electrode 33, so that a continuous satisfactory bead is formed. Besides, the tip of the GMA electrode 33 is heated with heat due to an arc discharge or with Joule heat, and is also heated by irradiation with the laser beams 24b, 24c. This may be another cause of high speed welding.

In addition, welding using a pure Ar gas as a shielding gas has been difficult in terms of arc stability, but such welding of an SUS material or a high Cr material in a pure Ar gas atmosphere becomes possible. That is, to stabilize an arc, an inert gas mixed with a small amount of $O_2$ or $CO_2$ is generally used as a shielding gas. When welding an SUS material or a high Cr material, a pure Ar gas has been used as a shielding gas because of the problem of corrosion resistance, and a cored wire containing an arc stabilizing element in a filler wire has been employed as a GMA electrode for stabilization of the arc. With the present laser beam machining head 22, by contrast, the arc can be stabilized by application of the laser beams 24b, 24c as stated earlier. Thus, welding of an SUS material or a high Cr material can be performed in a pure Ar gas atmosphere without the use of a special wire.

When the TIG electrode 42 is disposed coaxially with laser light in the laser beam machining head 22, the same actions and effects as described above can be obtained. Since the laser beam machining head 22 is very compact, its mounting on the multi-axis NC robot 23 is easy, and the laser beam machining head 22 can be easily positioned and moved to an arbitrary position by the multi-axis NC robot 23. Also, the laser beam machining head 22 is inexpensive, is free from the risk of damaging optical instruments, makes high speed welding possible, and permits welding in a pure Ar gas atmosphere.

When the filler wire 52 is disposed coaxially in the laser beam machining head 22, the following actions and effects can be obtained: Since the laser beam machining head 22 is very compact, its mounting on the multi-axis NC robot 23 is easy, and the laser beam machining head 22 can be easily positioned and moved to an arbitrary position by the multi-axis NC robot 23. Also, the laser beam machining head 22 is inexpensive, and is free from the risk of damaging optical instruments.

When the assist gas nozzle 61 is disposed coaxially in the laser beam machining head 22, the following actions and effects can be obtained: Since the laser beam machining head 22 is very compact, its mounting on the multi-axis NC robot 23 is easy, and the laser beam machining head 22 can be easily positioned and moved to an arbitrary position by the multi-axis NC robot 23. Also, the laser beam machining head 22 is inexpensive, and is free from the risk of damaging optical instruments. Moreover, the assist gas nozzle 61 can be thinned to a desirable degree to increase the flow velocity of the assist gas or feed the assist gas efficiently to the portion to be cut or drilled. Furthermore, the assist gas can be brought to a desired pressure to increase the flow velocity and the flow rate. Besides, a divergent nozzle can be employed as the assist gas nozzle 61, so that the assist gas can be jetted at a very high speed, thereby increasing the cutting speed or drilling speed remarkably.

When the powder nozzle 71 is disposed coaxially in the laser beam machining head 22, the following actions and effects can be obtained: Since the laser beam machining head 22 is very compact, its mounting on the multi-axis NC robot 23 is easy, and the laser beam machining head 22 can be easily positioned and moved to an arbitrary position by the multi-axis NC robot 23. Also, the laser beam machining head 22 is inexpensive, and is free from the risk of damaging optical instruments.

According to the present Embodiment 1, moreover, the spacing between the first divisional laser beam 24b and the second divisional laser beam 24c may be rendered adjustable by making the second reflecting mirror 28 rotatable by means of the mirror turning device 32 or by a manual operation. In this case, the rotation angle of the second reflecting mirror 28 is set appropriately to enlarge the spacing d between the focused tip 24b-1 of the first divisional laser beam 24b and the focused tip 24c-1 of the second divisional laser beam 24c appropriately, as shown in FIG. 4. By so doing, the base material 34 with a large gap width (e.g., a gap width of 1 mm) can be welded.

Also, the division ratio between the first divisional laser beam 24b and the second divisional laser beam 24c may be rendered adjustable by making the first reflecting mirror 27 movable by means of the mirror moving device 31 or by a manual operation, and the spacing between the first divisional laser beam 24b and the second divisional laser beam 24c may be rendered adjustable by making the second reflecting mirror 28 rotatable by means of the mirror turning device 32 or by a manual operation. In this case, as shown in FIG. 5, the moving position of the first reflecting mirror 27 is appropriately set to decrease the proportion of the first divisional laser beam 24b appropriately and increase the proportion of the second divisional laser beam 24c appropriately, and the rotation angle of the second reflecting mirror 28 is appropriately set to enlarge the spacing d between the focused tip 24b-1 of the first divisional laser beam 24b and the focused tip 24c-1 of the second divisional laser beam 24c appropriately. By so doing, the second divisional laser beam 24c is first applied to the base material 34 as indicated by an arrow F to achieve deep weld penetration, and then the first divisional laser beam 24b is applied, whereby a high quality bead can be formed. At this time, satisfactory welding free from porosity (voids) can be performed. That is, when a single laser beam is applied, porosity tends to occur in the portion to be welded. When the second divisional laser beam 24c is applied first, and then the first divisional laser beam 24b is applied, on the other hand, porosity, which has been once enclosed during application of the second divisional laser beam 24c, is broken open by irradiation with the first divisional laser beam 24*b*, whereby the porosity can be eliminated.

Also, the coaxial laser beam machining head 22 is configured such that the optical axis of the collimating lens array 26 and the optical axis of the focusing lens array 29 are displaced in a direction perpendicular to the optical axes, whereby the collimating lens array 26 is moved over toward one side relative to the focusing lens array 29 so that the first divisional laser beam 24*b* reflected by the first and second reflecting mirrors 27 and 28 is entered into the other side of the focusing lens array 29. Thus, as compared with the agreement between the optical axis of the collimating lens array 26 and the optical axis of the focusing lens array 29, the first divisional laser beam 24*b* and the second divisional laser beam 24*c* can be focused even by the focusing lens array 29 of a smaller diameter, and the entire laser beam machining head can be made smaller in size.

The laser beam machining apparatus provided with the above-described laser beam machining head 22 is an inexpensive laser beam machining apparatus with excellent machining ability for welding and cutting.

[Embodiment 2]

Figure 8A:
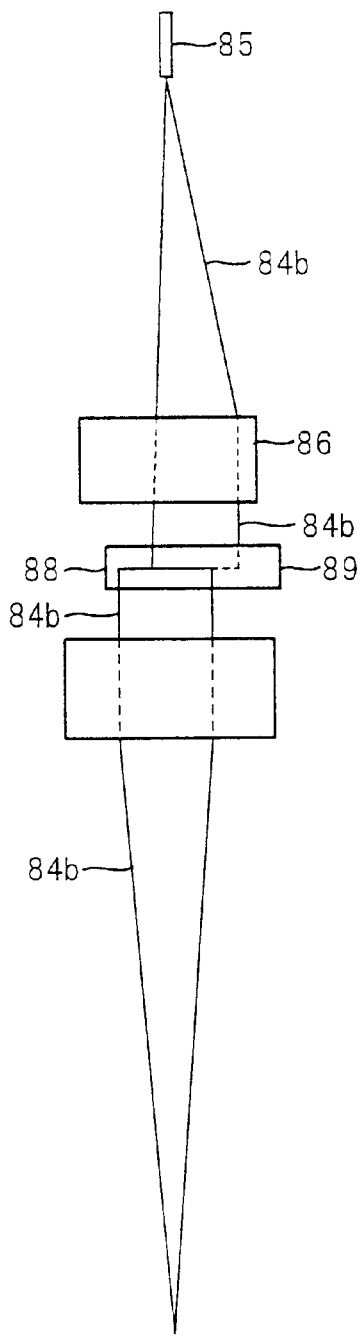
FIGS. 8A and 8B are side views showing only part of laser light reflected by reflecting mirrors, FIG. 8A being a view corresponding to FIG. 7A, and FIG. 8B being a view corresponding to FIG. 7B.
Figure 8B:
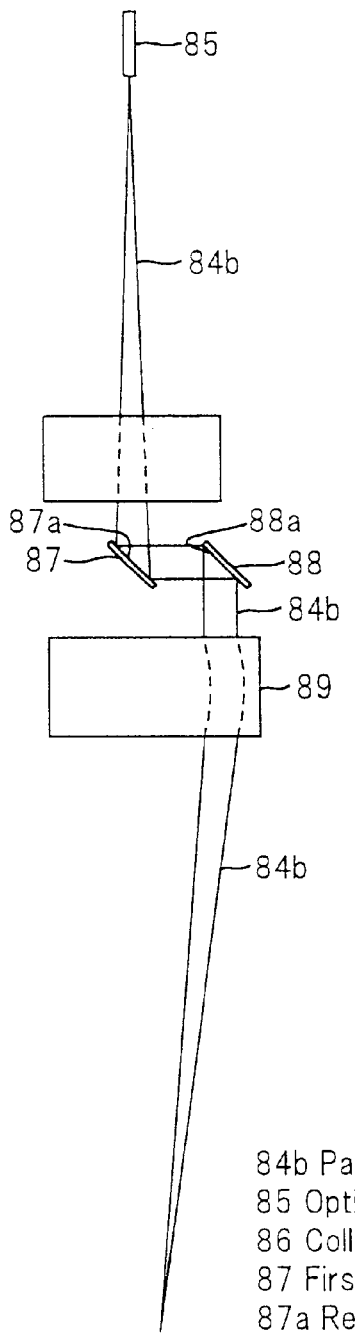
Figure 9A:
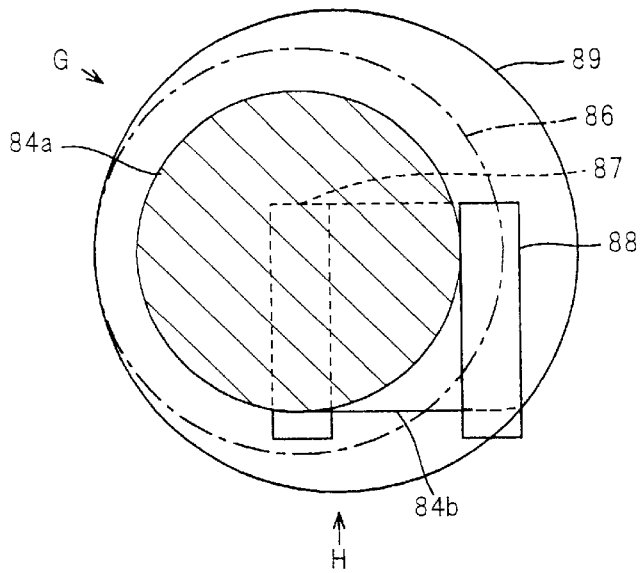
FIG. 9A is an enlarged sectional view taken on line I—I of FIG. 7A.
Figure 9B:
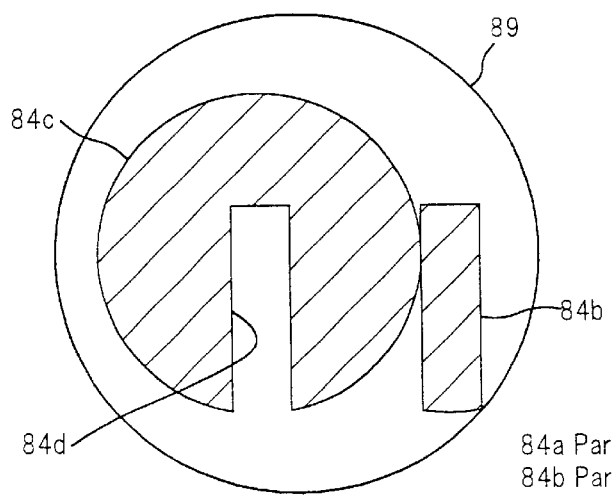
FIG. 9B is an enlarged sectional a view taken on line J—J of FIG. 7A.
Figure 9C:
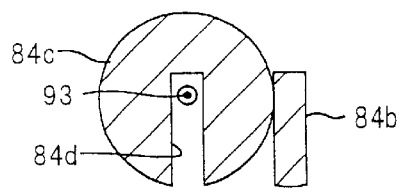
FIG. 9C is an enlarged sectional view taken on line K—K of FIG. 7A.
Figure 10A:
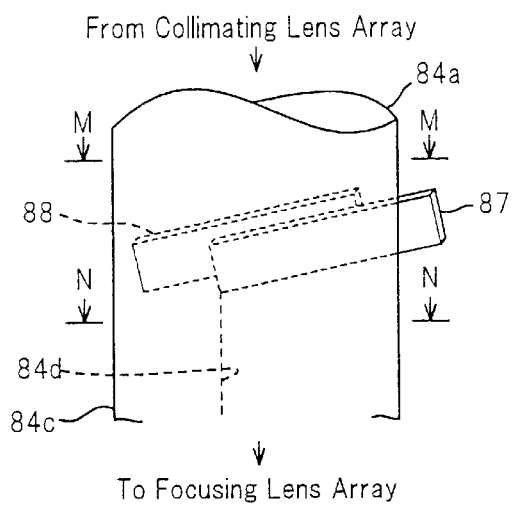
Figure 10B:
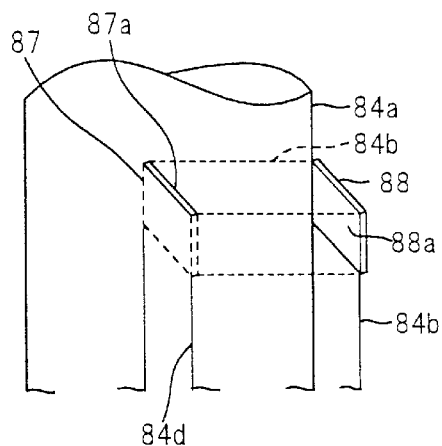
Figure 10C:
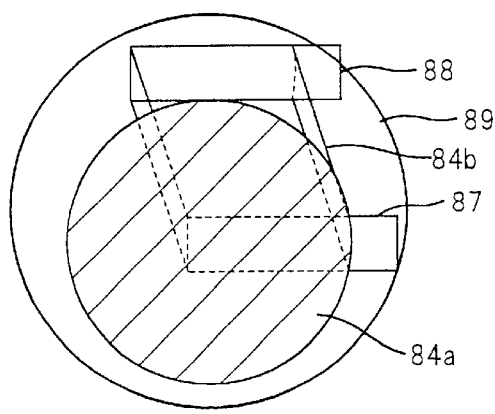
Figure 10D:
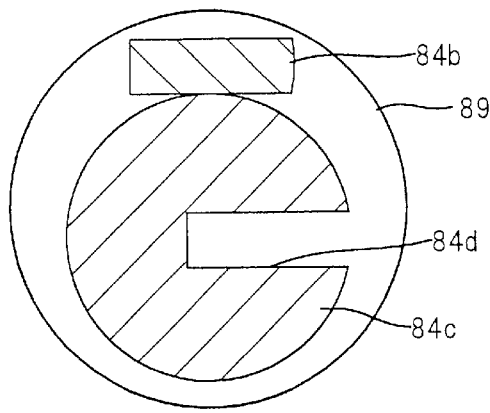
Figure 11:
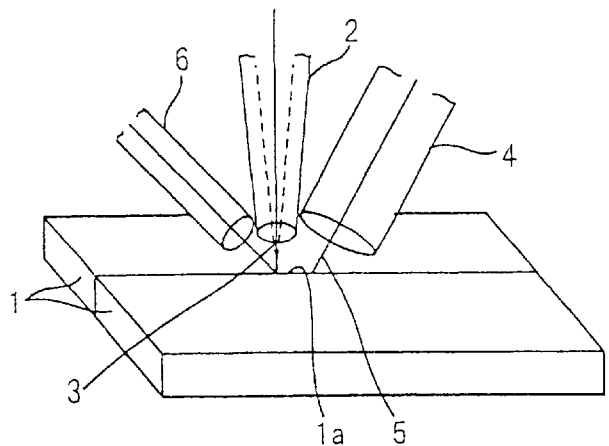
FIG. 11 is a configuration drawing of a conventional laser beam machining head.
Figure 12:
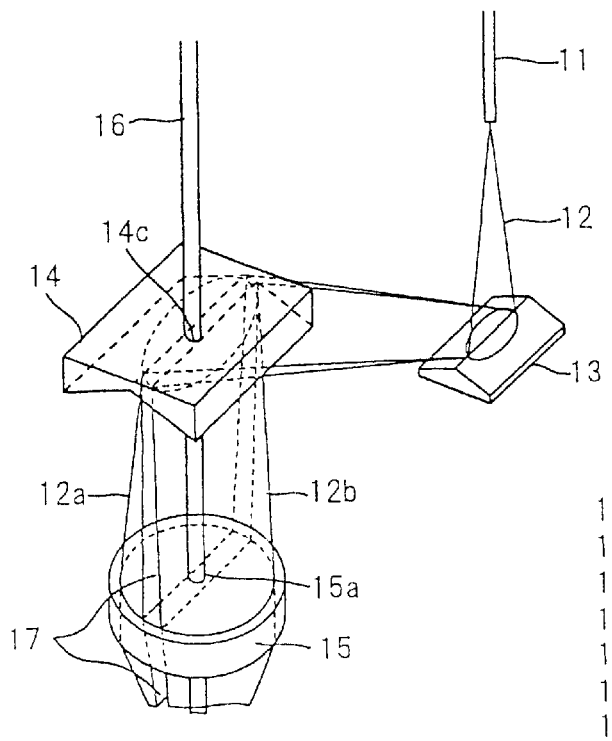
FIG. 12 is a configuration drawing of a conventional laser beam machining head.

FIG. 6 is a perspective view showing a system configuration of a laser beam machining apparatus according to Embodiment 2 of the present invention. FIGS. 7A and 7B are side views showing the configuration of an essential part of a laser beam machining head provided in the laser beam machining apparatus, FIG. 7A being a view as viewed in a direction of an arrow G in FIG. 9A, and FIG. 7B being a view as viewed in a direction of an arrow H in FIG. 9A. FIGS. 8A and 8B are side views showing only part of laser light reflected by reflecting mirrors, FIG. 8A being a view corresponding to FIG. 7A, and FIG. 8B being a view corresponding to FIG. 7B. FIG. 9A is an enlarged sectional view taken on line I—I of FIG. 7A, FIG. 9B is an enlarged sectional view taken on line J—J of FIG. 7A, and FIG. 9C is an enlarged sectional view taken on line K—K of FIG. 7A. FIGS. 10A to 10D are explanation drawings showing other arrangement examples of reflecting mirrors, in which FIG. 10A is a side view, FIG. 10B is a view as viewed from a direction of L in FIG. 10A, FIG. 10C is a sectional view taken on line M—M of FIG. 10A, and FIG. 10D is a sectional view taken on line N—N of FIG. 10A.

<Configuration>

As shown in FIG. 6, the laser beam machining apparatus according to the present Embodiment 2 has a YAG laser oscillator 81, an optical fiber 85 as laser light transmission means, a laser beam machining head 82, and a multi-axis NC robot 83 as laser beam machining head moving means. Laser light 84 oscillated from the YAG laser oscillator 81 is transmitted to an input portion of the laser beam machining head 82 by the optical fiber 85. The laser beam machining head 82 is mounted on the multi-axis NC robot 83, and positioned and moved to an arbitrary position by the multi-axis NC robot 83. The laser beam machining head 82 has in an outer cylinder 90 a collimating lens array 86 as one collimating optical system, a first reflecting mirror 87, a second reflecting mirror 88, a focusing lens array 89 as one focusing optical system, and a GMA electrode (MIG electrode or the like) 33 as a tip machining portion of GMA welding means (MIG welding means or the like).

A detailed description of the laser beam machining head 82 will be offered based on FIGS. 6 to 10A to 10D. The collimating lens array 86 is composed of a plurality of lenses arranged in series for making laser light 84, which has been transmitted by the optical fiber 85, into a parallel beam. The first reflecting mirror 87 and the second reflecting mirror 88 are disposed below the collimating lens array 86 in the drawings, and the focusing lens array 89 is disposed below these reflecting mirrors 87 and 88 in the drawings.

The first reflecting mirror 87 is a slender, rectangular, flat mirror having a predetermined width (a width which enables a space portion of a desired width to be formed in a body of the laser light). The first reflecting mirror 87 is inserted into a laser beam 84*a*, which has been rendered parallel by the collimating lens array 86, horizontally along a diametrical direction of a cross sectional plane of the laser beam 84*a* (in a direction perpendicular to the optical axis of the laser beam 84*a*) as far as a central part of the cross sectional plane (see FIGS. 7A, 8A and 9A), and a reflecting surface 87*a* of the first reflecting mirror 87 is inclined upward (toward the collimating lens array) and in a direction perpendicular to the direction of insertion of the first reflecting mirror 87 (see FIGS. 7B and 8B; inclined rightward in the drawings in the illustrated embodiment). Thus, the first reflecting mirror 87 reflects part 84*b* of the laser beam 84*a* to withdraw it out of a laser beam body 84*c*. As a result, a slender space portion 84*d* is formed in the laser beam body 84*c* (FIGS. 7B and 8B).

The second reflecting mirror 88 is a slender, flat mirror similar to the first reflecting mirror 87. The second reflecting mirror 88 is disposed outside the laser beam body 84*c*, and has a reflecting surface 88*a* inclined downward (toward the focusing lens array) and toward the first reflecting mirror 87. Thus, according to the second reflecting mirror 88, the part 84*b* of the laser light reflected by the first reflecting mirror 87 is reflected so as to be parallel to the laser beam body 84*c* and to be contiguous to or close to the outer peripheral surface of the laser beam body 84*c* (see FIGS. 7B and 9B). In the illustrated embodiment, the part 84*b* of the laser light is in contact with the outer peripheral surface of the laser beam body 84*c*, thereby making the diameter of the focusing lens array 89 as small as possible.

The arrangement of the first and second reflecting mirrors 87 and 88 is not restricted to the above-mentioned arrangement, but may be as shown in FIG. 10A to 10D. As shown in FIG. 10A to 10D, the first reflecting mirror 87 is inserted into the laser beam 84*a* along the diametrical direction of the cross sectional plane of the laser beam 84*a* and obliquely with respect to the optical axis of the laser beam 84*a* (obliquely toward the focusing lens array) (see FIG. 10A), with the reflecting surface 87*a* being directed upward (toward the collimating lens array), and is inclined in a direction perpendicular to the direction of insertion of the first reflecting mirror 87 (see FIG. 10B). Thus, the first reflecting mirror 87 reflects part 84*b* of the laser light outwardly of the laser beam body 84*c* and obliquely (see FIG. 10C).

The second reflecting mirror 88 is disposed outside the laser beam body 84*c*, is oblique relative to the optical axis of the laser beam 84*a* like the first reflecting mirror 87, and is inclined toward the first reflecting mirror 87 (see FIG. 10B), with its reflecting surface 88*a* being directed downward (toward the focusing lens array). Thus, the part 84*b* of the laser light reflected by the first reflecting mirror 87 is reflected so as to be parallel to the laser beam body 84*c* and to be contiguous to or close to the outer peripheral surface of the laser beam body 84*c* (see FIG. 10B). In this case, the part 84*b* of the laser light is positioned directly beside the laser beam body 84*c*, as shown in FIG. 10D. Thus, the diameter of the focusing lens array 89 can be made smaller than when the part 84*b* of the laser light is located at a position displaced from the position just beside the laser beam body 84*c*, as shown in FIG. 9B.

The focusing lens array 89 is composed of a plurality of lenses arranged in series, and focuses the laser beam body 84c, in which the space portion 84d has been formed by the first reflecting mirror 87, and the part 84b of the laser light, which has been reflected by the first and second reflecting mirrors 87 and 88, onto a portion 94a, to be welded, of a base material 94. At this time, the laser beam body 84c and the part 84b of the laser light are focused to one point. That is, the laser beam 84a is a parallel beam. Thus, even if the optical path lengths of the laser beam body 84c and the part 84b of the laser light are different between the collimating lens array 86 and the focusing lens array 89, these laser beams 84b and 84c can be focused to the one point by the focusing lens array 89. Moreover, the focusing lens array 89 is somewhat greater in diameter than the collimating lens array 86. The optical axis of the collimating lens array 86 and the optical axis of the focusing lens array 89 are displaced in a direction perpendicular to these optical axes, whereby the collimating lens array 86 is brought to one side (left side in FIG. 7B) relative to the focusing lens array 89, and the part 84b of the laser light reflected by the first and second reflecting mirrors 87 and 88 is entered into the other side (right side in FIG. 7B) of the focusing lens array 89. Because of such configuration, the laser beam body 84c transmitted straightly from the collimating lens array 86 to the focusing lens array 89, and the part 84b of the laser light withdrawn outside of the laser beam body 84c are incident on the single focusing lens array 89. Since the single focusing lens array 89 focuses both of the laser beam body 84c and the part 84b of the laser light, the entire laser beam machining head is very small in size. The diameter of the focusing lens array 89 is, for example, about 70 mm.

On the output side of the focusing lens array 89 (the lower side in the drawings), the GMA electrode 93 is supported by the outer cylinder 90 and disposed in the space portion 84d of the laser beam body 84c coaxially with the laser beam body. According to this configuration, GMA/YAG coaxial welding is possible. In the GMA welding means, an electric power and an inert gas are fed from a GMA welding machine 96 to a GMA head 95 at the tip via a guide tube 98, and a GMA electrode (filler wire) 93 is fed from a wire feeder 97, whereby GMA welding is performed. Instead of the GMA welding means, the tip machining portion of any other machining means as shown in FIGS. 3A to 3E may be disposed in the space portion 84d of the laser beam body 84c coaxially with the laser beam body 84c, as in the aforementioned Embodiment 1, although concrete explanations for these alternatives are omitted.

<Actions and Effects>

According to the present Embodiment 2, the same actions and effects as those of the aforementioned Embodiment 1 can be obtained. That is, the laser beam machining head 82 is composed of the single collimating lens array 86 for making the laser light 84 into a parallel beam; the first reflecting mirror 87 for reflecting part 84b of the laser beam 84a made parallel by the collimating lens array 86 to withdraw the part 84b of the laser beam 84a outside of the laser beam body 84c, thereby forming the space portion 84d in the laser beam body 84c; the second reflecting mirror 88 disposed outside the laser beam body 84c and adapted to reflect the part 84b of the laser light reflected by the first reflecting mirror 87 so as to be parallel to the laser beam body 84c and contact or approach the outer peripheral surface of the laser beam body 84c; the single focusing lens array 89 for focusing the laser beam body 84c, in which the space portion 84d has been formed by the first reflecting mirror 87, and the part 84b of the laser light reflected by the first and second reflecting mirrors 87 and 88, onto the portion 94a to be welded; and the GMA electrode 93 disposed in the space portion 84d of the laser beam body 84c coaxially with the laser beam body. Thus, the laser beam machining head 22 is very small in size and inexpensive, and is free from the risk of damaging optical instruments, in comparison with conventional laser beam machining heads. Since the laser beam machining head 82 is very compact, moreover, it can be easily mounted on the multi-axis NC robot 83. Since the GMA electrode 83 and the YAG laser light 84 (laser beam body 84c) are coaxial, furthermore, the laser beam machining head 82 can be easily positioned and moved to an arbitrary position by the multi-axis NC robot 83, and can perform three-dimensional machining easily. Besides, welding can be performed at a very high speed by coaxial welding using the GMA electrode 83 and the YAG laser light 84 (the laser beam body 84c and part 84b of the laser light). In addition, welding of an SUS material or a high Cr material in a pure Ar gas atmosphere also becomes possible.

The use of the other machining means shown in FIGS. 3A to 3E instead of the GMA welding means obtains the same actions and effects as in the Embodiment 1, although concrete explanations are omitted.

In addition, according to the present Embodiment 2, the part 84b of the laser beam taken out of the laser beam body 84c by the first reflecting mirror 87 is further reflected by the second reflecting mirror 88, and focused, along with the laser beam body 84c, onto the portion 94a, to be welded, by the focusing lens array 89. Thus, the energy of the laser light 84 can be effectively used without waste to minimize the loss of the laser light 84.

Besides, as shown in FIGS. 10A to 10D, the first reflecting mirror 87 is inserted into the laser beam 84a, which has been rendered parallel by the collimating lens array 86, along a diametrical direction of the cross sectional plane of the laser beam 84a and obliquely relative to the optical axis of the laser beam 84a, and is inclined in a direction perpendicular to the direction of insertion of the first reflecting mirror 87. By so doing, part 84b of the laser beam is reflected obliquely to the outside of the laser beam body 84c. In this case, part 84b of the laser light is positioned just beside the laser beam body 84c. Thus, as compared with part 84b of the laser light being located at a position displaced from the position just beside the laser beam body 84c as shown in FIG. 9B, the diameter of the focusing lens array 89 can be rendered smaller, and the entire laser beam machining head can be made smaller in size.

Also, the laser beam machining head 82 is configured such that the optical axis of the collimating lens array 86 and the optical axis of the focusing lens array 89 are displaced in a direction perpendicular to the optical axes, whereby the collimating lens array 86 is moved over toward one side relative to the focusing lens array 89 so that part 84b of the laser light reflected by the first and second reflecting mirrors 87 and 88 is entered into the other side of the focusing lens array 89. Thus, as compared with the agreement between the optical axis of the collimating lens array 86 and the optical axis of the focusing lens array 89, the laser beam body 84c and part 84b of the laser beam can be focused even by the focusing lens array 89 of a smaller diameter, and the entire laser beam machining head can be made smaller in size.

The laser beam machining apparatus provided with the above-described laser beam machining head 82 is an inexpensive laser beam machining apparatus with excellent machining ability for welding and cutting.

While the present invention has been described in the foregoing fashion, it is to be understood that the invention is not limited thereby, but may be varied in many other ways. Such variations are not to be regarded as a departure from the spirit and scope of the invention, and all such modifications as would be obvious to one skilled in the art are intended to be included within the scope of the appended claims.

What is claimed is:

1. A laser beam machining head comprising:
   one collimating optical system for making laser light into a parallel beam;
   a first reflecting mirror for reflecting part of the laser light made into the parallel beam by the collimating optical system to divide the laser light into two beams, a first divisional laser beam and a second divisional laser beam;
   a second reflecting mirror for further reflecting the first divisional laser beam reflected by the first reflecting mirror to form a space portion between the first divisional laser beam and the second divisional laser beam;
   one focusing optical system for focusing the first divisional laser beam and the second divisional laser beam onto a portion to be machined; and
   a tip machining portion of machining means disposed in the space portion between the first divisional laser beam and the second divisional laser beam coaxially with the laser beams.

2. The laser beam machining head of claim 1, wherein the second reflecting mirror is rendered normally and reversely rotatable, whereby spacing between a focused tip of the first divisional laser beam and a focused tip of the second divisional laser beam is adjustable.

3. The laser beam machining head of claim 1, wherein the first reflecting mirror is rendered movable, whereby a division ratio for the first divisional laser beam and the second divisional laser beam can be adjusted, and the second reflecting mirror is rendered normally and reversely rotatable, whereby spacing between a focused tip of the first divisional laser beam and a focused tip of the second divisional laser beam can be adjusted.

4. The laser beam machining head of claim 1, wherein an optical axis of the collimating optical system and an optical axis of the focusing optical system are displaced in a direction perpendicular to the optical axes, whereby the collimating optical system is moved over toward one side relative to the focusing optical system so that the first divisional laser beam reflected by the first and second reflecting mirrors is entered into other side of the focusing optical system.

5. A laser beam machining head comprising:
   one collimating optical system for making laser light into a parallel beam;
   a reflecting mirror for reflecting part of the laser light made into the parallel beam by the collimating optical system to withdraw the part of the laser light out of a body of the laser light, thereby forming a space portion in the body of the laser light;
   one focusing optical system for focusing the body of the laser light, where the space portion has been formed, onto a portion to be machined; and
   a tip machining portion of machining means disposed in the space portion of the body of the laser light coaxially with the body of the laser light.

6. A laser beam machining head comprising:
   one collimating optical system for making laser light into a parallel beam;
   a first reflecting mirror for reflecting part of the laser light made into the parallel beam by the collimating optical system to withdraw the part of the laser light out of a body of the laser light, thereby forming a space portion in the body of the laser light;
   a second reflecting mirror located outside the body of the laser light and adapted to reflect the part of the laser light reflected by the first reflecting mirror so as to be parallel to the body of the laser light and be in contact with or in proximity to an outer peripheral surface of the body of the laser light;
   one focusing optical system for focusing the body of the laser light, where the space portion has been formed by the first reflecting mirror, and the part of the laser light reflected by the first and second reflecting mirrors, onto a portion to be machined; and
   a tip machining portion of machining means disposed in the space portion of the body of the laser light coaxially with the body of the laser light.

7. The laser beam machining head of claim 6, wherein the first reflecting mirror is inserted into the laser light, which has been made into the parallel beam by the collimating optical system, along a diametrical direction of a cross sectional plane of the laser light and obliquely relative to an optical axis of the laser light, and is also inclined in a direction perpendicular to a direction of insertion of the first reflecting mirror, whereby the part of the laser light is reflected obliquely to an outside of the body of the laser light.

8. The laser beam machining head of claim 6, wherein an optical axis of the collimating optical system and an optical axis of the focusing optical system are displaced in a direction perpendicular to the optical axes, whereby the collimating optical system is moved over toward one side relative to the focusing optical system so that the part of the laser light reflected by the first and second reflecting mirrors is entered into other side of the focusing optical system.

9. The laser beam machining head of claim 1, wherein the tip machining portion of the machining means is a GMA electrode, a TIG electrode, a filler wire, an assist gas nozzle, or a powder nozzle.

10. The laser beam machining head of claim 5, wherein the tip machining portion of the machining means is a GMA electrode, a TIG electrode, a filler wire, an assist gas nozzle, or a powder nozzle.

11. The laser beam machining head of claim 6, wherein the tip machining portion of the machining means is a GMA electrode, a TIG electrode, a filler wire, an assist gas nozzle, or a powder nozzle.

12. The laser beam machining head of claim 1, wherein the tip machining portion of the machining means is the assist gas nozzle, and the assist gas nozzle is a divergent nozzle.

13. The laser beam machining head of claim 5, wherein the tip machining portion of the machining means is the assist gas nozzle, and the assist gas nozzle is a divergent nozzle.

14. The laser beam machining head of claim 6, wherein the tip machining portion of the machining means is the assist gas nozzle, and the assist gas nozzle is a divergent nozzle.

15. A laser beam machining apparatus comprising:
   the laser beam machining head of claim 1;
   a laser oscillator for oscillating laser light;

laser light transmission means for transmitting the laser light oscillated by the laser oscillator to the laser beam machining head; and laser beam machining head moving means for positioning and moving the laser beam machining head to an arbitrary position.

16. A laser beam machining apparatus comprising:

the laser beam machining head of claim 5;

a laser oscillator for oscillating laser light;

laser light transmission means for transmitting the laser light oscillated by the laser oscillator to the laser beam machining head; and laser beam machining head moving means for positioning and moving the laser beam machining head to an arbitrary position.

17. A laser beam machining apparatus comprising:

the laser beam machining head of claim 6;

a laser oscillator for oscillating laser light;

laser light transmission means for transmitting the laser light oscillated by the laser oscillator to the laser beam machining head; and laser beam machining head moving means for positioning and moving the laser beam machining head to an arbitrary position.

* * * * *